United States Patent
Chang et al.

(10) Patent No.: US 10,162,468 B2
(45) Date of Patent: Dec. 25, 2018

(54) METHOD AND CONTROLLER FOR DETECTING TOUCH OR PROXIMITY

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 180 days.

(21) Appl. No.: 15/066,473

(22) Filed: Mar. 10, 2016

(65) Prior Publication Data

US 2016/0188045 A1 Jun. 30, 2016

Related U.S. Application Data

(63) Continuation-in-part of application No. 14/141,780, filed on Dec. 27, 2013, now abandoned, and a continuation-in-part of application No. 14/819,768, filed on Aug. 6, 2015, which is a continuation of application No. 14/016,686, filed on Sep. 3, 2013, now Pat. No. 9,134,868.

(60) Provisional application No. 61/695,805, filed on Aug. 31, 2012.

(30) Foreign Application Priority Data

Dec. 28, 2012 (TW) .............................. 101150794 A

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 8,102,376 B2 | 1/2012 | Lii et al. | |
| 8,581,867 B2 | 11/2013 | Shin et al. | |
| 2008/0087477 A1 | 4/2008 | Cho et al. | |
| 2009/0284495 A1* | 11/2009 | Geaghan | G06F 3/0416 345/174 |
| 2011/0141054 A1 | 6/2011 | Wu et al. | |
| 2011/0221701 A1 | 9/2011 | Zhang et al. | |
| 2012/0139849 A1* | 6/2012 | Syu | G06F 3/0416 345/173 |

FOREIGN PATENT DOCUMENTS

TW          201017494          5/2010

* cited by examiner

*Primary Examiner* — Matthew Yeung
(74) *Attorney, Agent, or Firm* — WPAT, PC

(57) ABSTRACT

When at least one external object approaches or touches a touch sensor, profiles in a scanning signal corresponding to each external object will appear. The smallest value between the profiles corresponding to a first and a second external object is designated as a division value when the profiles corresponding to the first and the second external objects overlap. The overlapping profiles can be divided into the portion of the first external object and the portion of the second external object, respectively.

17 Claims, 13 Drawing Sheets

METHOD AND CONTROLLER FOR DETECTING TOUCH OR PROXIMITY

CROSS REFERENCE TO RELATED APPLICATIONS

This application is a continuation-in-part of U.S. patent application Ser. No. 14/141,780, filed Dec. 27, 2013, which claims priority under 35 U.S.C. 119 to Taiwan patent application, 101150794, filed on Dec. 28, 2012, and is also a continuation-in-part of U.S. patent application Ser. No. 14/819,768, filed Aug. 6, 2015, which is a continuation of U.S. patent application Ser. No. 14/016,686, filed Sep. 3, 2013, which claims the benefit of U.S. Provisional Application No. 61/695,805, filed on Aug. 31, 2012, the disclosure of which is incorporated herein by reference.

BACKGROUND OF THE INVENTION

1. Field of the Invention

The present invention relates to a method and device for a touch sensor, and more particularly, to a method and device for a touch sensor with touches that are close to each other.

2. Description of the Prior Art

A traditional mutual capacitive sensor includes an insulating surface layer, a first conductive layer, a dielectric layer, and a second conductive layer, wherein each of the first and second conductive layers have a plurality of first conductive strips and second conductive strips that are made up by a plurality of conductive pads and connection wires connecting these conductive pads in series.

In mutual capacitive sensing, one of the first and second conductive layers is driven, while the other one is sensed. For example, a driving signal is sequentially provided to each of the first conductive strips, and corresponding to each first conducting strip being driven by the driving signal, signals from all of the second conducting strips are sensed, which represent capacitive coupling signals at intersections between the driven first conducting strip and the respective second conducting strips. As such, capacitive coupling signals representing intersections between all of the first and second conducting strips can be obtained, forming an image of capacitive values.

As such, a capacitive-value image before any touch is obtained as a basis, and this basis is compared with capacitive-value images detected subsequently to determine if there is a touch or proximity of an external object, and further determine the location of the touch or proximity.

The portion corresponding to a touch or proximity of an external object in the capacitive-value image is called "touch related sensing information". When two external objects are too close to each other, the touch related sensing information corresponding to different external objects may partially overlap. If the locations are determined directly using the overlapped portion, there will be large errors in the locations of these two external objects, and the determined locations will be closer than the actual locations, as if they are mutually attracted.

Referring to FIGS. 1A, 1B and 1C, schematic diagrams illustrating how to calculate the locations of two neighboring fingers in the prior art are shown. FIG. 1A shows a one-dimensional (1D) sensing information obtained based on all of the second conducting strips as described earlier. When a first finger approaches or touches a first conducting strip that is currently being driven, it will cause a corresponding profile of values S1 to appear in the 1D sensing information. Each value corresponds to a location. Therefore, based on the values and the locations, the centroid location P1 of the first finger can be calculated to be at the location of 3 (($1\times2+2\times5+3\times7+4\times5+5\times1$)/($2+5+7+5+2$)=3). Similarly, FIG. 1B shows a corresponding profile of values S2 for a second finger. If there are no overlap between the profile values of the first finger and the second finger, then the centroid location P2 of the second finger can be calculated to be at the location of 7 (($5\times1+6\times6+7\times9+8\times6+9\times1$)/($1+6+9+6+1$)=7).

However, as shown in FIG. 1C, if profile values S12 of overlapping portion of the first and the second fingers are used directly for calculating the centroid locations, then there will be error. The resulting error locations of the first and the second fingers Pe1 and Pe2 are 3.09 (($1\times2+2\times5+3\times7+4\times5+5\times3$)/($2+5+7+5+3$)=3.09) and 6.84 (($5\times3+6\times6+7\times9+8\times6+9\times1$)/($3+6+9+6+1$)=6.84), respectively.

For systems that have little tolerance on errors, the above location errors may exceed the error tolerance limit. For example, the error tolerance limit of a system is 1 mm, and the corresponding location width between the second conducting strips is 7 mm. The error location of the second finger is offset from the original centroid location by 0.16 location width, i.e. about 1.02 mm, which exceeds the error tolerance limit of the system.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

When two external objects are too close to each other, the touch related sensing information corresponding to different external objects may partially overlap. If the locations are determined directly using the overlapped portion, there will be large errors in the locations of these two external objects, which may easily exceed the error tolerance limit of the system. One objective of the present invention is to assign a value overlapped by different external objects to the respective external objects according to the ratios of two adjacent values to the sum of these two values, thereby reducing errors in locations.

The above and other objectives of the present invention can be achieved by the following technical scheme. A method for detecting touch or proximity may include: obtaining a 1D sensing information comprising continuous positive values based on signals of a touch sensor; designating a relative minimum as a division value to identify a first sub profile and a second sub profile if the continuous positive values comprise the relative minimum between a first relative maximum and a second relative maximum, wherein the first sub profile includes the first relative maximum but excludes the division value, and the second relative maximum includes the second relative maximum but excludes the division value; and determining a first proportion and a second proportion in the division value based on the ratios of a first value and a second value, wherein the first value comprises at least the value of the first sub profile closest to the division value, and the second value comprises at least the value of the second sub profile closest to the division value.

The above and other objectives of the present invention can also be achieved by the following technical scheme. A controller for detecting touch or proximity executes the following steps: obtaining a 1D sensing information comprising continuous positive values based on signals of a touch sensor; designating a relative minimum as a division value to identify a first sub profile and a second sub profile if the continuous positive values comprise the relative minimum between a first relative maximum and a second relative maximum, wherein the first sub profile includes the first relative maximum but excludes the division value, and the second relative maximum includes the second relative maximum but excludes the division value; and determining a first proportion and a second proportion in the division value based on the ratios of a first value and a second value, wherein the first value comprises at least the value of the first sub profile closest to the division value, and the second value comprises at least the value of the second sub profile closest to the division value.

The above and other objectives of the present invention can be achieved by the following technical scheme. A method for detecting touch or proximity may include: obtaining a 2D sensing information based on signals of a touch sensor, wherein the 2D sensing information comprising a plurality of 1D sensing information arranged in parallel; designating a relative minimum as a division value to identify a first sub profile and a second sub profile if at least one 1D sensing information comprises continuous positive values comprising the relative minimum between a first relative maximum and a second relative maximum, wherein the first sub profile includes the first relative maximum but excludes the division value, and the second relative maximum includes the second relative maximum but excludes the division value; and determining a first proportion and a second proportion in the division value based on the ratios of a first value and a second value, wherein the first value comprises at least the value of the first sub profile closest to the division value, and the second value comprises at least the value of the second sub profile closest to the division value; collecting the values of the first sub profile and the first proportion to form the values of a first profile, and collecting the values of the second sub profile and the second proportion to form the values of a second profile; and collecting the first profiles of the adjacent two 1D sensing information to form a first region if the two first profiles overlaps, and collecting the second profiles of the adjacent two 1D sensing information to form a second region if the two second profiles overlaps.

The above and other objectives of the present invention can also be achieved by the following technical scheme. A controller for detecting touch or proximity executes the following steps: obtaining a 2D sensing information based on signals of a touch sensor, wherein the 2D sensing information comprising a plurality of 1D sensing information arranged in parallel; designating a relative minimum as a division value to identify a first sub profile and a second sub profile if at least one 1D sensing information comprises continuous positive values comprising the relative minimum between a first relative maximum and a second relative maximum, wherein the first sub profile includes the first relative maximum but excludes the division value, and the second relative maximum includes the second relative maximum but excludes the division value; and determining a first proportion and a second proportion in the division value based on the ratios of a first value and a second value, wherein the first value comprises at least the value of the first sub profile closest to the division value, and the second value comprises at least the value of the second sub profile closest to the division value; collecting the values of the first sub profile and the first proportion to form the values of a first profile, and collecting the values of the second sub profile and the second proportion to form the values of a second profile; and collecting the first profiles of the adjacent two 1D sensing information to form a first region if the two first profiles overlaps, and collecting the second profiles of the adjacent two 1D sensing information to form a second region if the two second profiles overlaps.

The above and other objectives of the present invention can be achieved by the following technical scheme. A method for detecting touch or proximity may include: obtaining a 2D sensing information based on signals of a touch sensor; determining a first proportion and a second proportion in each division value if the 2D sensing information comprises a first sub region, all values of which are positive, and a second sub region, all values of which are positive, and each of one or more adjacent division values is adjacent to the first sub region and the second sub region, wherein the division values are positive; and determining a first 2D centroid location based on all first proportions and all values of the first sub region, and determining a second 2D centroid location based on all second proportions and all values of the second sub region.

The above and other objectives of the present invention can also be achieved by the following technical scheme. A controller for detecting touch or proximity executes the following steps: obtaining a 2D sensing information based on signals of a touch sensor; determining a first proportion and a second proportion in each division value if the 2D sensing information comprises a first sub region, all values of which are positive, and a second sub region, all values of which are positive, and each of one or more adjacent division values is adjacent to the first sub region and the second sub region, wherein the division values are positive; and determining a first 2D centroid location based on all first proportions and all values of the first sub region, and determining a second 2D centroid location based on all second proportions and all values of the second sub region.

With the above technical scheme, the present invention includes at least the following advantages and beneficial effects: errors in determined locations caused by the overlapping region can be reduced by reassigning the division value overlapped by the two profiles that are too close to each other.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1A:
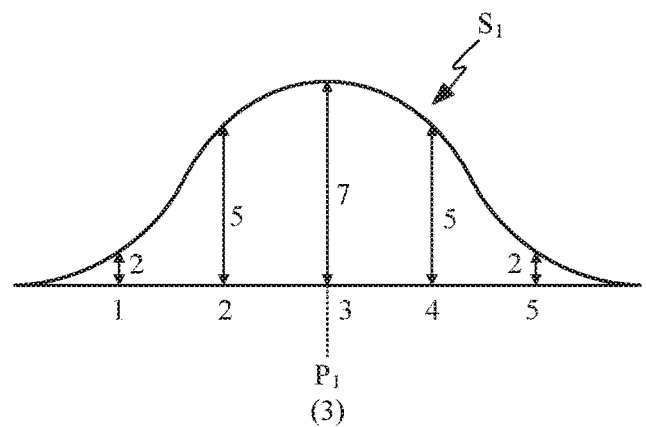
FIGS. 1A to 1C are schematic diagrams illustrating overlapping signals of a touch sensor as a result of two fingers being too close to each other.
Figure 1B:
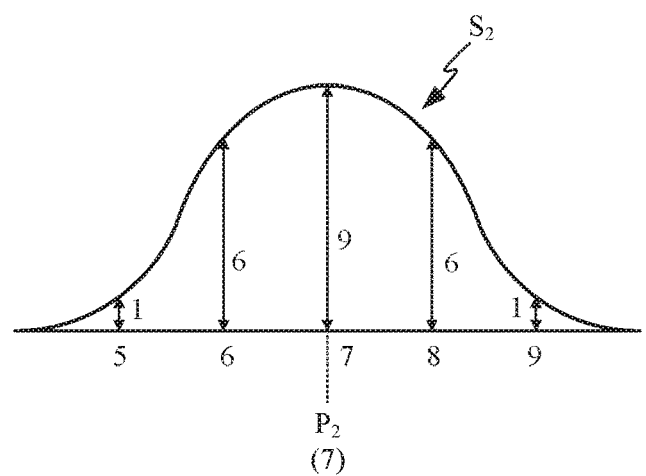
Figure 1C:
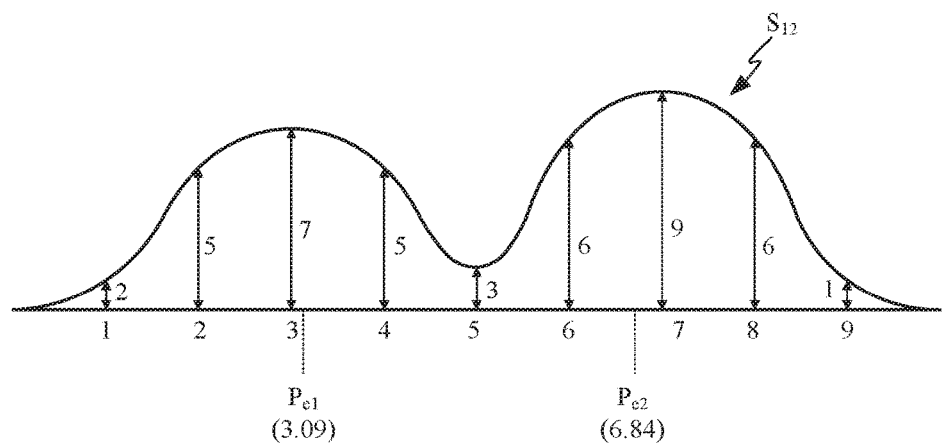

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 2A:
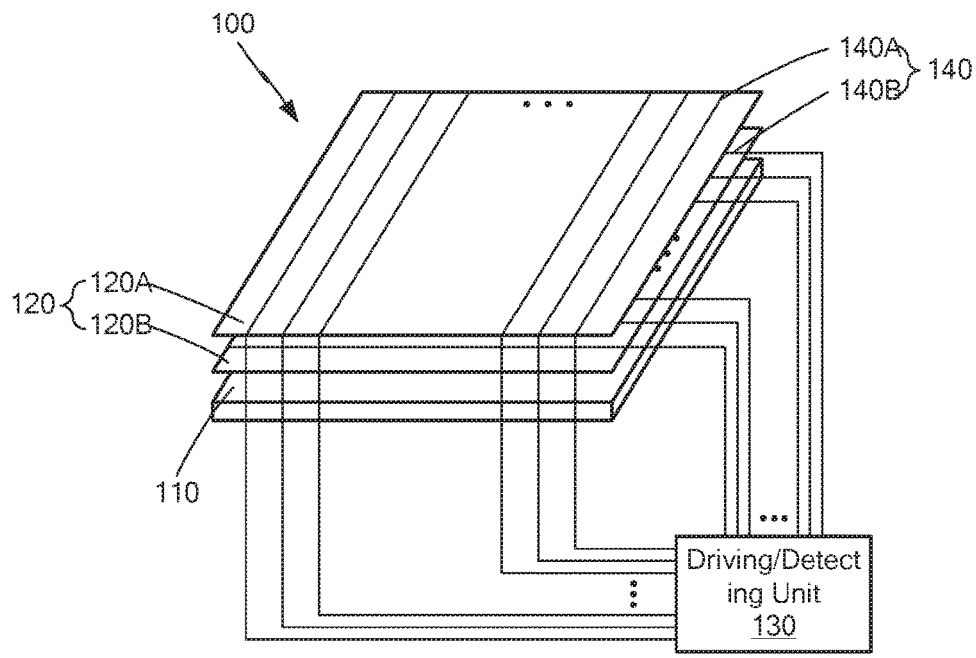
FIGS. 2A and 2B are schematic diagrams illustrating a mutual-capacitive sensor.

Referring to FIG. 2A, a location detecting device 100 applicable to the present invention is shown, which includes a touch sensor 120 and a driving/detecting unit 130. The touch sensor 120 has a sensing layer. In an example of the present invention, the sensing layer can include a first sensing layer 120A and a second sensing layer 120B. The first and second sensing layers 120A and 120B each has a plurality of conductive strips 140, wherein the first conductive strips 140A of the first sensing layer 120A and the second conductive strips 140B of the second sensing layer 120B overlap one another other. In another example of the present invention, the first and second conductive strips 140A and 140B are disposed on a co-planar sensing layer. The driving/detecting unit 130 produces sensing information based on signals of the conductive strips 140. In the case of self-capacitive detection, for example, conductive strips 140 that are being driven are detected. In the case of mutual-capacitive detection, some of the conductive strips 140 that are not being directly driven by the driving/detecting unit 130 are detected. In addition, the touch sensor 120 can be disposed on a display 110. An optional shielding layer (not shown) can be interposed between the touch sensor 120 and the display 110. In a preferred example of the present invention, there is no rear shielding layer between the touch sensor 120 and the display 110 so as to reduce the thickness of the touch sensor 120.

The first and second conductive strips can be a plurality of column conductive strips and row conductive strips arranged in columns and rows; a plurality of first dimensional conductive strips and second dimensional conductive strips arranged in first and second dimensions; or a plurality of first axial conductive strips and second axial conductive strips arranged in first and second axes. In addition, the first and second conductive strips can be arranged in orthogonal or non-orthogonal directions. For example, in a polar coordinate system, one of the first and second conductive strips can be arranged in a radial direction, and the other one of the first and second conductive strips can be arranged in a circular direction. Furthermore, one of the first and second conductive strips can be driven conductive strips, while the other one of the first and second conductive strips can be detected conductive strips. The "first dimension" and "second dimension", "first axis" and "second axis", "driving" and "detecting", "driven" or "detected" conductive strips can be used to mean the "first and "second" conductive strips, including but not limited to, being arranged in orthogonal grids, and in any other geometric configurations consisting of first dimensional and second dimensional intersecting conductive strips.

Figure 2B:
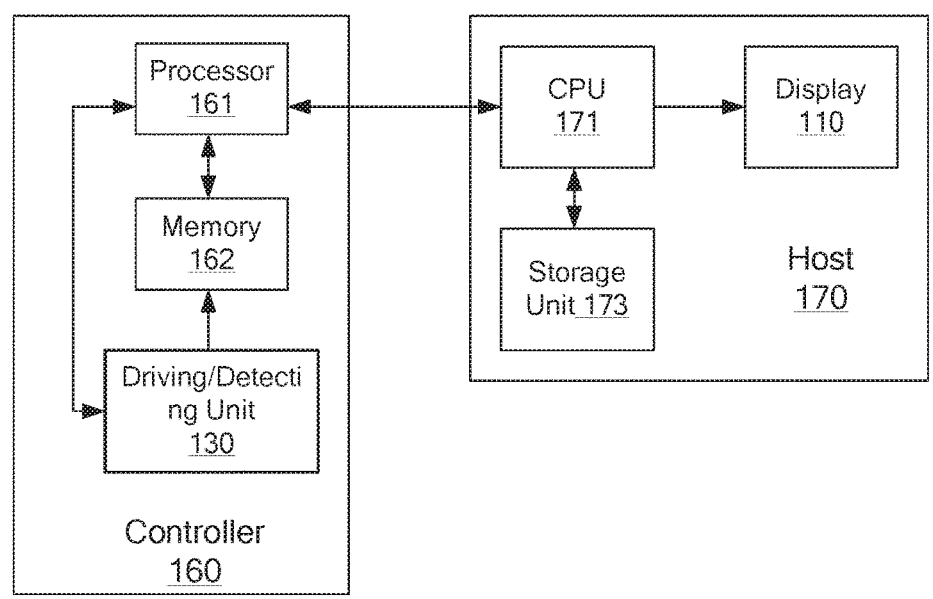

The location detecting device 100 of the present invention can be applicable to a computing system as shown in FIG. 2B, which includes a controller 160 and a host 170. The controller includes the driving/detecting unit 130 to operatively couple the touch sensor 120 (not shown). In addition, the controller 160 can include a processor 161 for controlling the driving/detecting unit 130 to generate the sensing information. The sensing information can be stored in a memory 162 accessible by the processor 161. Moreover, the host 170 constitutes the main body of the computing system, and mainly includes a central processing unit 171, a storage unit 173 that can be accessed by the central processing unit 171, and the display 110 for displaying results of operations.

In another example of the present invention, there is a transmission interface between the controller 160 and the host 170. The controlling unit transmits data to the host via the transmission interface. One with ordinary skill in the art can appreciate that the transmission interface may include, but not limited to, UART, USB, I2C, Bluetooth, Wi-Fi, IR and other wireless or wired transmission interfaces. In an example of the present invention, data transmitted can be locations (e.g. coordinates), identified results (e.g. gesture codes), commands, sensing information or other information provided by the controller 160.

In an example of the present invention, the sensing information can be initial sensing information generated under the control of the processor 161, and this information is passed onto the host 170 for location analysis, such as location analysis, gesture determination, command identification, and so on. In another example of the present invention, the sensing information can be analyzed by the processor 161 first before forwarding the determined locations, gestures, commands, or the like to the host 170. The present invention does not limit to this example, and one with ordinary skill in the art can readily recognize other interactions between the controller 160 and the host 170.

At each intersection of the conductive strips, the upper and lower conductive strips form the positive and negative electrodes. Each intersection can be regarded as one pixel in an image. When one or more external objects approach or touch the sensing device, the image can be regarded as a photographed touch image (e.g. the pattern of a finger upon touching the sensing device).

When a driven conductive strip is being provided with a driving signal, the driven conductive strip itself produces self capacitance, and produces mutual capacitance on each intersection of the driven conductive strip. The self-capacitive detection is detecting the self-capacitance of all the conductive strips, which is particularly useful in determining the proximity or touch of a single external object.

In the mutual-capacitive detection, when a driven conductive strip is being provided with a driving signal, capacitances or changes in capacitances of all intersections on the driven conductive strip with all sensed conductive strips arranged in different dimensions to the driven conductive strip are detected, and are regarded as a row of pixels. Accordingly, all the rows of pixels are combined to form the image. When one or more external objects approach or touch the sensing device, the image can be regarded as a photographed touch image, which is particularly useful in determining the proximities or touches of a plurality of external objects.

These conductive strips (the first and second conductive strips) can be made of transparent or opaque materials, such as transparent Indium Tin Oxide (ITO). In terms of the structure, it can be categorized into a Single ITO (SITO) structure and a Double ITO (DITO) structure. One with ordinary skill in the art can appreciate that other materials can be used as the conductive strips, such as carbon nanotube, and they will not be further described.

In an example of the present invention, the horizontal direction is regarded as the first direction, while the vertical direction is regarded as the second direction. Thus, the horizontal conductive strips are the first conductive strips, and the vertical conductive strips are the second conductive strips. However, one with ordinary skill in the art can appreciate that the above is merely an example of the present invention, and the present invention is not limited to this. For example, the vertical direction can be regarded as the first direction, while the horizontal direction can be regarded as the second direction.

During two-dimensional (2D) mutual capacitive detection, alternating driving signals are sequentially provided to each first conductive strip, and one-dimensional (1D) sensing information corresponding to each driven first conductive strip is obtained from the signals of the second conductive strips. Sensing information of all the first conductive strips are combined together to form 2D sensing information. 1D sensing information can be generated based on the signal of a second conductive strip, or based on the difference between the signal of a conductive strip and a reference value. In addition, the sensing information can be generated based on current, voltage, level of capacitive coupling, amount of charge or other electrical characteristics, and can be in analog or digital form.

When there is no external object actually approaching or covering the touch sensor, or when the system has not determined any external object actually approaching or covering the touch sensor, the location detecting device may generate reference values based on the signals of the second conductive strips. These reference values represent any stray capacitance on the touch sensor. Sensing information can be generated based on the signals of the second conductive strips or the signals of the second conductive strips after being subtracted by the respective reference values.

Figure 3:
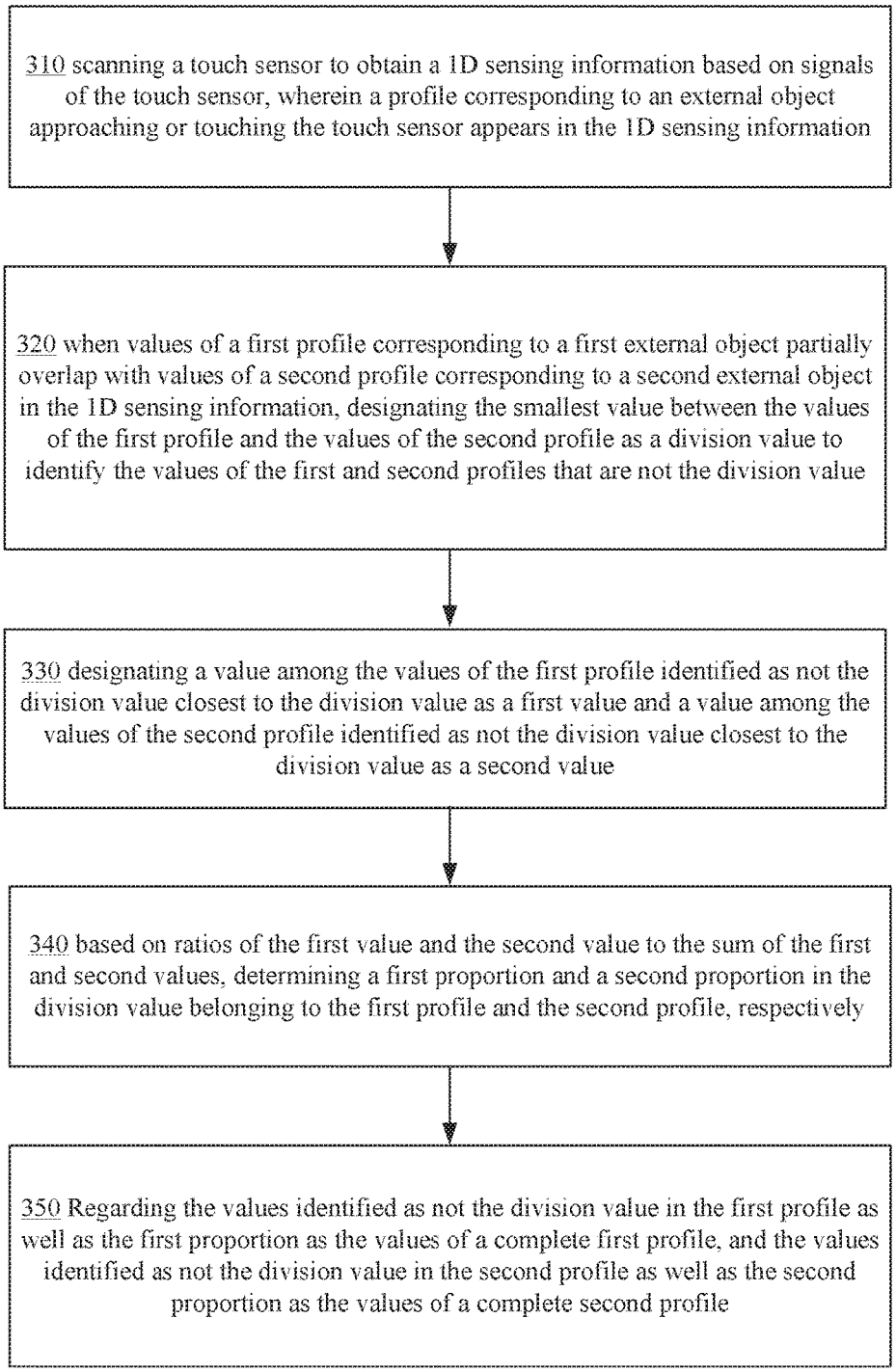
FIG. 3 is a schematic diagram illustrating the flowchart of a method for detecting touch or proximity in accordance with an embodiment of the present invention.

Referring to FIG. 3, a method for detecting touch or proximity in accordance with a best mode of the present invention is shown. In step 310, a touch sensor is scanned to obtain a 1D sensing information based on the signals of the touch sensor. When at least one external object approaches or touches a touch sensor, a profile corresponding to each external object will appear in the sensing information. In an example of the present invention, the touch sensor performs self-capacitive scanning. The 1D sensing information may be a vertical 1D sensing information or a horizontal 1D sensing information, wherein values of a first profile and values of a second profile are either in the vertical 1D sensing information or the horizontal 1D sensing information. In another example of the present invention, the touch sensor performs mutual-capacitive scanning. The sensing information includes a plurality of horizontal or vertical 1D sensing information. In other words, the touch sensor performs mutual-capacitive scanning to create an image that is made up by a plurality of 1D sensing information in parallel. Each 1D sensing information is generated based on capacitive coupling signals of the first conducting strips or the second conducting strips. In an example of the present invention, the 1D sensing information consists of a plurality of continuous differential values. For example, in the first conducting strips or second conducting strips, a differential value is generated by subtracting the signal of each conducting strip by that of a preceding (or following) conducting strip. In the case where there are no preceding (or following) conducting strips, no differential values are generated. Thus, when the touch sensor performs scanning, a plurality of horizontal or vertical differential values are generated, and then they are converted to the vertical and/or horizontal 1D sensing information. Alternatively, multiple sets of differential values arranged in parallel are generated to form a differential image, which is then converted to the image. Converting differential values into 1D sensing information means accumulating each differential values and all the preceding (or following) differential values to create one of the values in the 1D sensing information.

In another example of the present invention, 1D sensing information is formed by a plurality of continuous dual differential values. For example, in the first or second conducting strips, a dual differential value is generated based on the signal of a conducting strip (e.g. a first signal) and the signals of the following (or preceding) two conducting strips (e.g. a second signal and a third signal). As a specific example, (second signal−first signal)−(third signal−second signal)=dual differential value. In other words, a dual differential value is the difference of a pair of differential values. Therefore, converting dual differential values into differential values means accumulating each dual differential value with all of the following (or preceding) differential values to create a differential value, and the differential values are converted into 1D sensing information as described before.

Each value of the 1D sensing information after converting from a plurality of differential values or a plurality of dual differential values corresponds to one of the second conducting strips or the first conducting strips. After the influence of the noise is removed, each value of the 1D sensing information theoretically is proportional to the signal of the corresponding conducting strip.

Next, as shown in step 320, when the values of a first profile corresponding to a first external object partially overlap with the values of a second profile corresponding to a second external object in the 1D sensing information, the smallest value between the values of the first profile and the values of the second profile is designated as a division value to identify the values of the first and second profiles that are not the division value. As shown in step 330, a value among the values of the first profile identified as not the division value closest to the division value is designated as a first value and a value among the values of the second profile identified as not the division value closest to the division value is designated as a second value. Thereafter, as shown in step 340, based on the ratios of the first value and the second value to the sum of the first and second values, a first proportion and a second proportion in the division value belonging to the first profile and the second profile, respectively, are determined. Then, as shown in step 350, the values identified as not the division value in the first profile as well as the first proportion are regarded as the values of a complete first profile, and the values identified as not the division value in the second profile as well as the second proportion are regarded as the values of a complete second profile.

The values of the complete profiles (e.g. the first and second profiles) can be used to calculate the centroid location, or used for image segmentation. For example, a first centroid location is calculated based on the values of the complete first profile, and a second centroid location is calculated based on the values of the complete second profile. Further, for example, the first external object and the second external object will result in the appearance of the values corresponding to the first profile and the values corresponding to the second profile in a plurality of 1D sensing information in the image. For example, the touch sensor performs mutual-capacitive scanning. The sensing information includes a plurality of vertical or horizontal 1D sensing information, and the first external object results in the appearance of the values of the first profile corresponding to the first external object in at least two 1D sensing information. In addition, the second external object results in the appearance of the values of the second profile corresponding to the second external object that partially overlap with the values of the first profile corresponding to the first external object in at least one 1D sensing information. With the method of the present invention, the first and second profiles can be divided at a division point, and proportions of the division value are assigned, thereby defining the areas of touches or proximities of the first and second external objects respectively. Further, the coordinates of the first and second external objects can be further calculated.

The first proportion is defined as (division value×first value)/(first value+second value), and the second proportion is defined as (division value×second value)/(first value+second value), wherein the touch sensor has a plurality of sensed conducting strips. The first value, the division value and the second value are generated from signal values of three adjacent conducting strips among the sensed conducting strips.

Accordingly, a device for detecting touch or proximity is provided by the present invention, which includes a touch sensor and a controller. The touch sensor includes a plurality of first conducting strips (or second conducting strips) for providing capacitive coupling signals, and the controller generates 1D sensing information based on the signals of the first conducting strips (or second conducting strips). When at least one external object approaches or touches a touch sensor, a profile corresponding to each external object will appear during scanning of the touch sensor. The smallest value between the profiles corresponding to a first and a second external object is designated as a division value when the values of the profiles corresponding to the first and the second external objects partially overlap. Based on a first value and a second value adjacent to the division value, a first proportion and a second proportion in the division value belonging to the first profile and the second profile, respectively, are determined.

In accordance with the above, the present invention further includes a device for scanning the touch sensor to obtain a 1D sensing information based on the signals of the touch sensor. When at least one external object approaches or touches a touch sensor, a profile corresponding to each external object will appear during scanning of the touch sensor. In addition, in accordance with step 320, the controller further includes a device for, when the values of a first profile corresponding to a first external object partially overlap with the values of a second profile corresponding to a second external object in the 1D sensing information, designating the smallest value between the values of the first profile and the values of the second profile as a division value to consequently identify the values of the first and second profiles that are not the division value. In which, the controller identifies the values of the first and second profiles that are not the division value based on the division value, and regards the values identified as not the division value in the first profile as well as the first proportion as the values of a complete first profile, and the values identified as not the division value in the second profile as well as the second proportion as the values of a complete second profile. The first and the second values are in the values identified as not the division value in the first profile and the values identified as not the division value in the second profile, respectively.

Moreover, the controller further includes a device for designating a value among the values of the first profile identified as not the division value closest to the division value as a first value and a value among the values of the second profile identified as not the division value closest to the division value as a second value, and a device for determining, based on the ratios of the first value and the second value to the sum of the first and second values, a first proportion and a second proportion in the division value belonging to the first profile and the second profile, respectively. Moreover, the controller further includes a device for regarding the values identified as not the division value in the first profile as well as the first proportion as the values of a complete first profile, and the values identified as not the division value in the second profile as well as the second proportion as the values of a complete second profile.

Figure 4A:
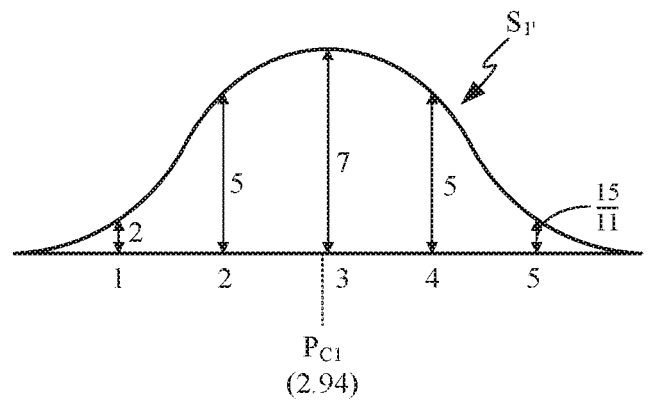
FIGS. 4A and 4B are schematic diagrams illustrating assigning a division value based on ratios.
Figure 4B:
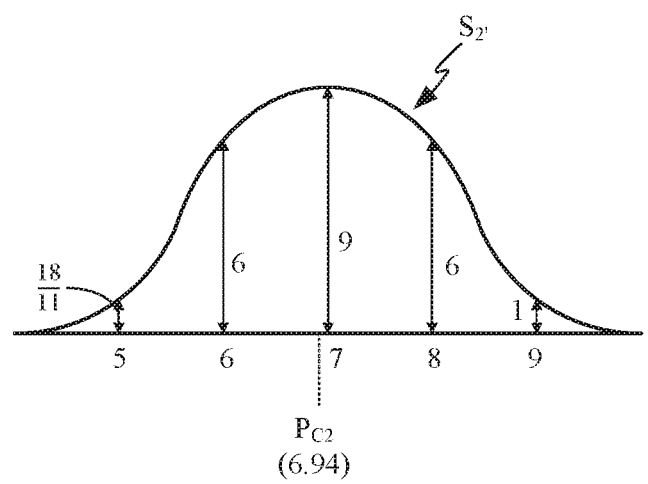

Referring to FIGS. 4A and 4B, the 5th value is the division value, and the 4th and the 6th values are the first value of a profile S1' corresponding to a first finger and the second value of a profile S2' corresponding to a second finger, respectively. Therefore, an adjusted centroid location Pc1 based on the values of the complete first profile would be 2.94 ((1×2+2×5+3×7+4×5+5×(15/(5+6)))/(2+5+7+5+(15/(5+6)))=2.94), and an adjusted centroid location Pc2 based on the values of the complete second profile would be 6.94 ((5×(18/(5+6))+6×6+7×9+8×6+9×1)/((18/(5+6))+6+9+6+1)=6.94).

Figure 5:
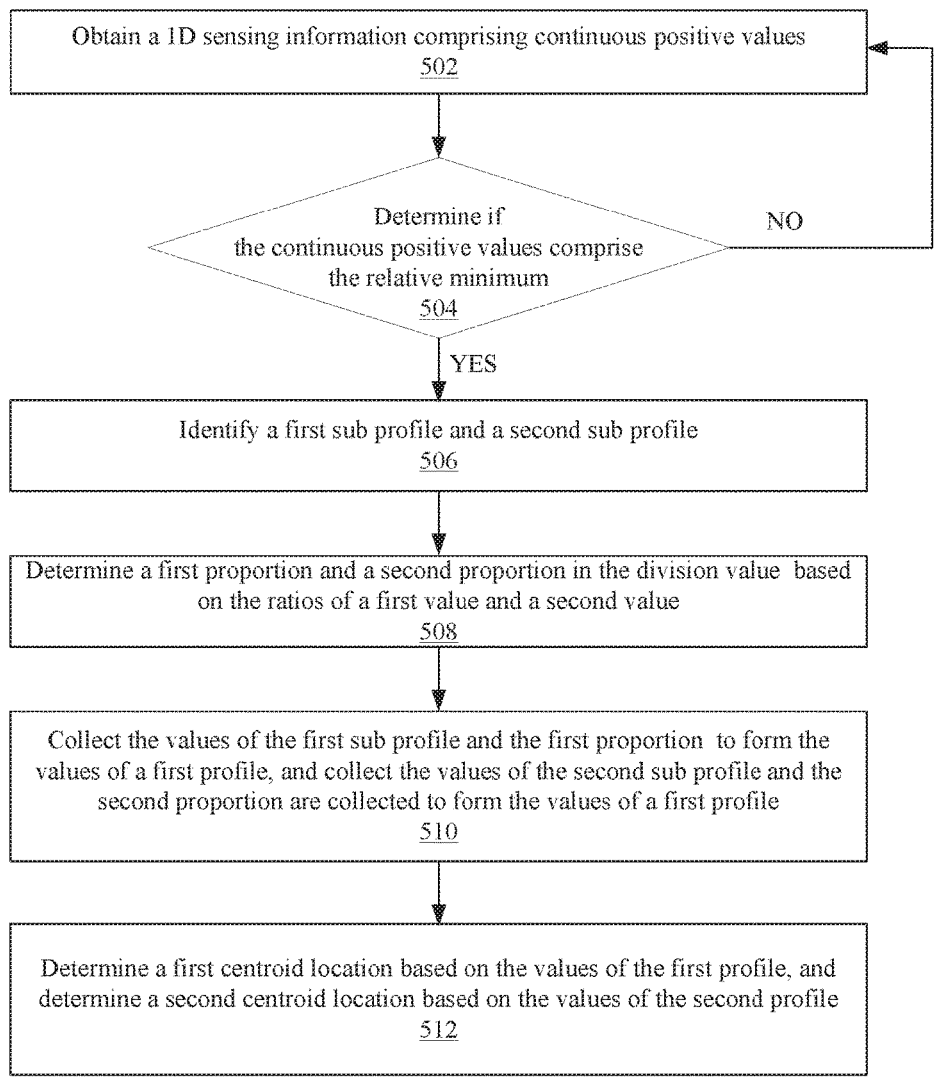
FIG. 5 is a schematic diagram illustrating the flowchart of a method for detecting touch or proximity in accordance with an embodiment of the present invention.

In accordance with the above, the present invention further discloses a method for detecting touch or proximity as illustrated in FIG. 5. As shown in step 502, a 1D sensing information comprising continuous positive values is obtained based on signals of a touch sensor. As shown in step 504, it is determined if the continuous positive values comprise the relative minimum between a first relative maximum and a second relative maximum. If YES, a relative minimum is designated as a division value to identify a first sub profile and a second sub profile, as shown in step 506. If NO, return to step 502. The first sub profile includes the first relative maximum but excludes the division value, and the second relative maximum includes the second relative maximum but excludes the division value.

As shown in step 508, a first proportion and a second proportion in the division value are determined based on the ratios of a first value and a second value. Then, as shown in step 510, the values of the first sub profile and the first proportion are collected to form the values of a first profile, and the values of the second sub profile and the second proportion are collected to form the values of a first profile. As shown in step 512, a first centroid location is determined based on the values of the first profile, and a second centroid location is determined based on the values of the second profile.

In addition, the present invention discloses a controller for detecting touch or proximity to execute the following steps according to the foregoing method. The controller obtains a 1D sensing information comprising continuous positive values based on signals of a touch sensor. A relative minimum is designated as a division value to identify a first sub profile and a second sub profile if the continuous positive values comprise the relative minimum between a first relative maximum and a second relative maximum. A first proportion and a second proportion in the division value are determined based on the ratios of a first value and a second value. The first value comprises at least the value of the first sub profile closest to the division value, and the second value comprises at least the value of the second sub profile closest to the division value. The values of the first sub profile and the first proportion are collected to form the values of a first profile, and the values of the second sub profile and the second proportion are collected to form the values of a first profile. A first centroid location is determined based on the values of the first profile, and a second centroid location is determined based on the values of the second profile.

The first profile is caused by the touch or the proximity of a first external object, and the second profile is caused by the touch or the proximity of a second external object. The first external object and the second external object are so close to each other that the first profile and the second profile overlap. The division value is due to the overlapping portion between the values of the first profile and the values of the second profile.

The first proportion is equal to (division value×first value)/(first value+second value), and the second proportion is equal to (division value×second value)/(first value+second value). The first value comprises at least the value of the first sub profile closest to the division value, and the second value comprises at least the value of the second sub profile closest to the division value.

According to a first embodiment, the first value is the value of the first sub profile closest to the division value and greater a first threshold, and the second value is the value of the second sub profile closest to the division value and greater a second threshold.

Referring to FIGS. 4A and 4B, if both the first and second thresholds are zero, the 5th value is the division value, and the 4th and the 6th values are the first value of a profile S1' corresponding to a first finger and the second value of a profile S2' corresponding to a second finger, respectively. Therefore, an adjusted centroid location Pc1 based on the values of the complete first profile would be 2.94 ((1×2+2×5+3×7+4×5+5×(15/(5+6)))/(2+5+7+5+(15/(5+6)))=2.94), and an adjusted centroid location Pc2 based on the values of the complete second profile would be 6.94 ((5×(18/(5+6))+6×6+7×9+8×6+9×1)/((18/(5+6))+6+9+6+1)=6.94).

In addition, if the first threshold is greater than the value closest to the division value of the first sub profile, but smaller than the minimum of the first relative maximum, the first value is the value between the first relative maximum and the value closest to the division value of the first sub profile. If the second threshold is greater than the value closest to the division value of the second sub profile, but smaller than the minimum of the second relative maximum, the second value is the value between the second relative maximum and the value closest to the division value of the second sub profile.

According to a second embodiment, the first value is the difference between a threshold and the value of the first sub profile closest to the division value, and the second value is the difference between a threshold and the value of the second sub profile closest to the division value. The threshold is greater than or equal to zero, but smaller than or equal to the division value.

Figure 6A:
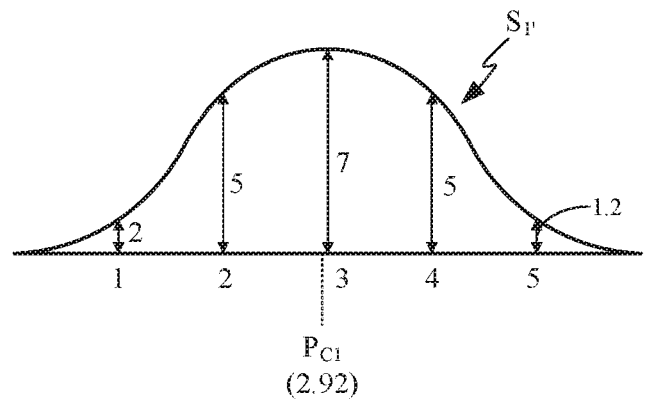
FIGS. 6A and 6B are schematic diagrams illustrating assigning a division value based on ratios.
Figure 6B:
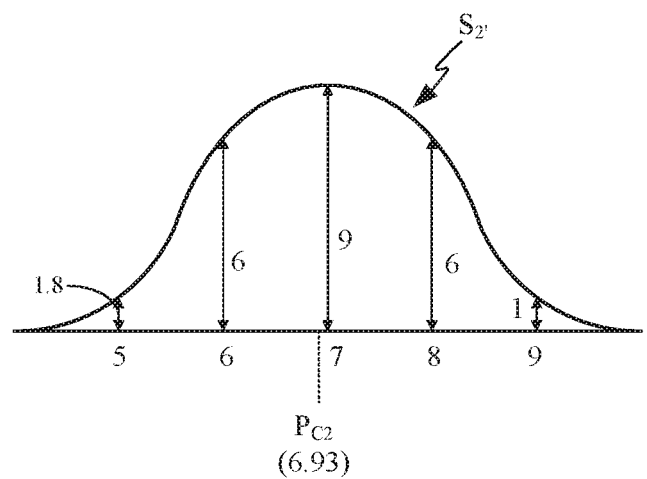

Referring to FIGS. 6A and 6B, the 5th value is the division value, and the threshold is set to the division value 3. Therefore, the first value is the difference 2 between the threshold 3 and the 4th value 5 of the first sub profile closest to the division value, and the second value is the difference 3 between the threshold 3 and the 6th value 6 of the second sub profile closest to the division value. The first proportion is equal to 3×(2/(2+3))=1.2, and the second proportion is equal to 3×(3/(2+3))=1.8. Accordingly, an adjusted centroid location Pc1 based on the values of the complete first profile would be (1×2+2×5+3×7+4×5+5×1.2)/(2+5+7+5+1.2)=2.92, and an adjusted centroid location Pc2 based on the values of the complete second profile would be (5×1.8+6×6+7×9+8×6+9×1)/(1.8+6+9+6+1)=6.93.

According to a third embodiment, a first difference is generated by subtracting a threshold from each value of the first sub profile greater than the threshold, and a second difference is generated by subtracting the threshold from each value of the second sub profile greater than the threshold. The first value is a sum of the first differences, and the second value is a sum of the second differences, wherein the threshold is greater than or equal to zero, but smaller than or equal to the division value.

Referring to FIGS. 6A and 6B, the 5th value is the division value, and the threshold is set to the division value 3. In the first sub profile, a plurality of first differences are respectively the 2nd value (5−3)=2, the 3rd value (7−3)=4, and the 4th value (5−3)=2. Thus, the first value is equal to 2+4+2=8. In the second sub profile, a plurality of second differences are respectively the 6th value (6−3)=3, the 7rd value (9−3)=6, and the 8th value (6−3)=3. Thus, the second value is equal to 3+6+3=12. The first proportion is equal to 3×(8/(8+12))=1.2, and the second proportion is equal to 3×(12/(8+12))=1.8. Accordingly, an adjusted centroid location Pc1 based on the values of the complete first profile would be (1×2+2×5+3×7+4×5+5×1.2)/(2+5+7+5+1.2)=2.92, and an adjusted centroid location Pc2 based on the values of the complete second profile would be (5×1.8+6×6+7×9+8×6+9×1)/(1.8+6+9+6+1)=6.93.

According to a fourth embodiment, the first value is a sum of the values of the first sub profile greater than a threshold, and the second value is a sum of the values of the second sub profile greater than the threshold, wherein the threshold is greater than or equal to zero, but smaller than or equal to the division value.

Figure 7A:
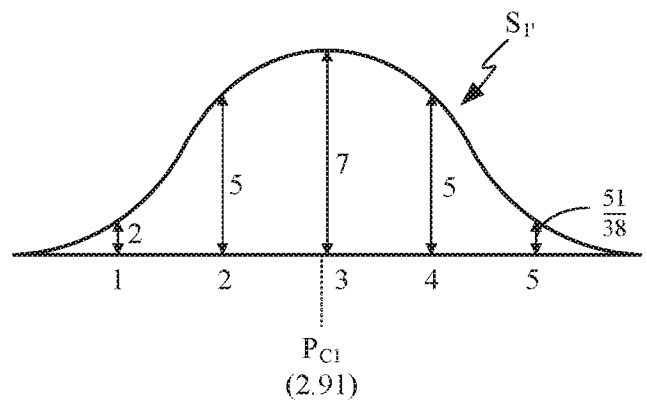
FIGS. 7A and 7B are schematic diagrams illustrating assigning a division value based on ratios.
Figure 7B:
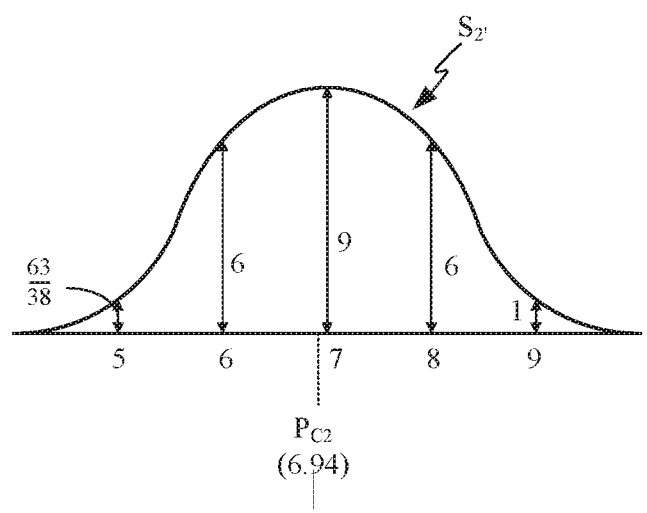

Referring to FIGS. 7A and 7B, the 5th value is the division value, and the threshold is set to the division value 3. The sum of the values of the first sub profile greater than the threshold 3 is equal to (5+7+5)=17, and thus the first value is equal to 17. The sum of the values of the second sub profile greater than the threshold 3 is equal to (6+9+6)=21, and thus the second value is equal to 21. The first proportion is equal to 3×(17/(17+21))=51/38, and the second proportion is equal to 3×(21/(17+21))=63/38. Accordingly, an adjusted centroid location Pc1 based on the values of the complete first profile would be (1×2+2×5+3×7+4×5+5×(51/38))/(2+5+7+5+(51/38))=2.91, and an adjusted centroid location Pc2 based on the values of the complete second profile would be (5×(63/38)+6×6+7×9+8×6+9×1)/((63/38)+6+9+6+1)=6.94.

According to a fifth embodiment, the first value is a sum from the first relative maximum to the value of the first sub profile closest to the division value, and the second value is a sum from the second relative maximum to the value of the second sub profile closest to the division value (not shown in figures).

Figure 8A:
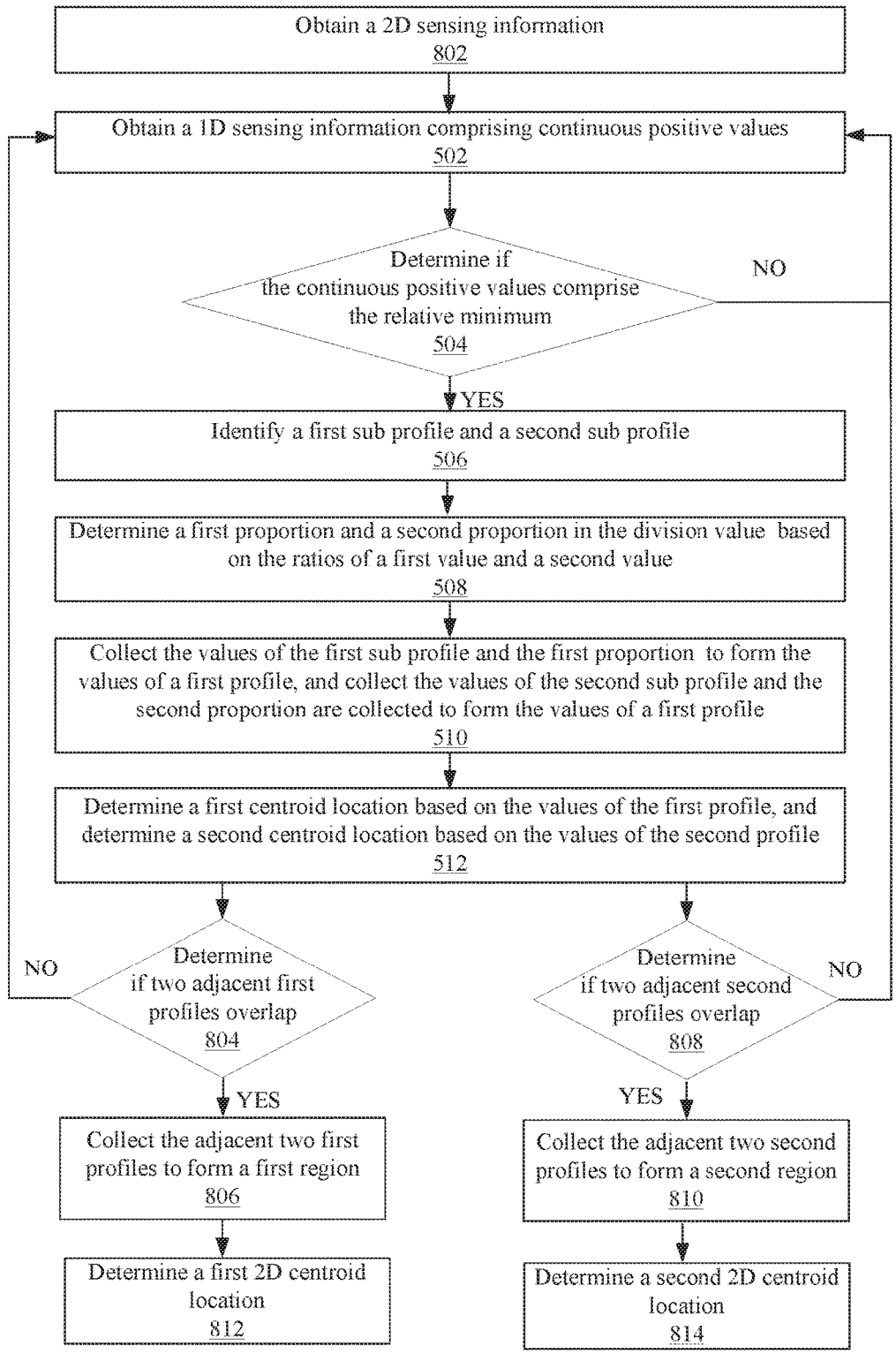
FIG. 8A is a schematic diagram illustrating the flowchart of a method for detecting touch or proximity in accordance with an embodiment of the present invention.

For determining each 2D centroid location of two external object close to each other, the present invention further discloses a method for detecting touch or proximity, as shown in FIG. 8A. As shown in step 802, a 2D sensing information is obtained based on signals of a touch sensor, wherein the 2D sensing information comprising a plurality of 1D sensing information arranged in parallel. Then, step 502 to step 512 are executed as described above.

As shown in step 502, a 1D sensing information comprising continuous positive values is obtained based on the 2D sensing information. As shown in step 504, it is determined if the continuous positive values comprise the relative minimum between a first relative maximum and a second relative maximum. If YES, a relative minimum is designated as a division value to identify a first sub profile and a second sub profile, as shown in step 506. If NO, return to step 502.

As shown in step 508, a first proportion and a second proportion in the division value are determined based on the ratios of a first value and a second value. Then, as shown in step 510, the values of the first sub profile and the first proportion are collected to form the values of a first profile, and the values of the second sub profile and the second proportion are collected to form the values of a first profile. As shown in step 512, a first centroid location is determined based on the values of the first profile, and a second centroid location is determined based on the values of the second profile.

Then, as shown in step 804, it is determined if the first profiles of the adjacent two 1D sensing information overlap based on the overlapping relationship between the adjacent two first profiles. If YES, the adjacent two first profiles are collected to form a first region, as shown in step 806. If NO, return to step 502.

The overlapping relationship between the adjacent two first profiles reaches at least one of the following conditions: the ratio of overlapping between the adjacent two first profiles exceeds a ratio threshold; the number of values overlapped by the adjacent two first profiles exceeds a number threshold; and the distance between the centroid locations of the adjacent two first profiles is within a distance threshold.

Similarly, as shown in step 808, it is determined if the second profiles of the adjacent two 1D sensing information overlap based on the overlapping relationship between the adjacent two second profiles. If YES, the adjacent two second profiles are collected to form a second region, as shown in step 810. If NO, return to step 502.

The overlapping relationship between the adjacent two second profiles reaches at least one of the following conditions: the ratio of overlapping between the adjacent two second profiles exceeds a ratio threshold; the number of values overlapped by the adjacent two second profiles exceeds a number threshold; and the distance between the centroid locations of the adjacent two second profiles is within a distance threshold.

Then, as shown in step 812, a first 2D centroid location is determined based on all first centroid location of the first region. As shown in step 814, a second 2D centroid location is determined based on all second centroid location of the second region.

In addition, the present invention discloses a controller for detecting touch or proximity to execute the following steps according to the foregoing method. The controller obtains a 2D sensing information based on signals of a touch sensor, wherein the 2D sensing information comprising a plurality of 1D sensing information arranged in parallel. A relative minimum is designated as a division value to identify a first sub profile and a second sub profile if at least one 1D sensing information comprises continuous positive values comprising the relative minimum between a first relative maximum and a second relative maximum, wherein the first sub profile includes the first relative maximum but excludes the division value, and the second relative maximum includes the second relative maximum but excludes the division value. A first proportion and a second proportion in the division value is determined based on the ratios of a first value and a second value, wherein the first value comprises at least the value of the first sub profile closest to the division value, and the second value comprises at least the value of the second sub profile closest to the division value. The values of the first sub profile and the first proportion are collected to form the values of a first profile, and the values of the second sub profile and the second proportion are collected to form the values of a second profile. The first profiles of the adjacent two 1D sensing information are collected to form a first region if the two first profiles overlaps, and the second profiles of the adjacent two 1D sensing information are collected to form a second region if the two second profiles overlaps.

Then, a first 2D centroid location could be determined based on the values of the first region, and a second 2D centroid location could be determined based on the values of the second region.

Or a first centroid location could be determined based on the values of each first profile, and then a first 2D centroid location could be determined based on all first centroid locations of the first region. Similarly, a second centroid location could be determined based on the values of each second profile, and then a second 2D centroid location could be determined based on all second centroid locations of the second region.

According to the first embodiment as described above, in each 1D sensing information, the first value is the value of the first sub profile closest to the division value, and the second value is the value of the second sub profile closest to the division value.

According to the second embodiment as described above, in each 1D sensing information, the first value is the difference between a threshold and the value of the first sub profile closest to the division value, and the second value is the difference between a threshold and the value of the second sub profile closest to the division value. The threshold is greater than or equal to zero, but smaller than or equal to the division value.

According to the third embodiment as described above, in each 1D sensing information, a first difference is generated by subtracting a threshold from each value of the first sub profile greater than the threshold, and a second difference is generated by subtracting the threshold from each value of the second sub profile greater than the threshold. The first value is a sum of the first differences, and the second value is a sum of the second differences, wherein the threshold is greater than or equal to zero, but smaller than or equal to the division value.

According to the fourth embodiment as described above, in each 1D sensing information, the first value is a sum of the values of the first sub profile greater than a threshold, and the second value is a sum of the values of the second sub profile greater than the threshold, wherein the threshold is greater than or equal to zero, but smaller than or equal to the division value.

According to the fifth embodiment as described above, in each 1D sensing information, the first value is a sum from the first relative maximum to the value of the first sub profile closest to the division value, and the second value is a sum from the second relative maximum to the value of the second sub profile closest to the division value (not shown in figures).

Figure 9:
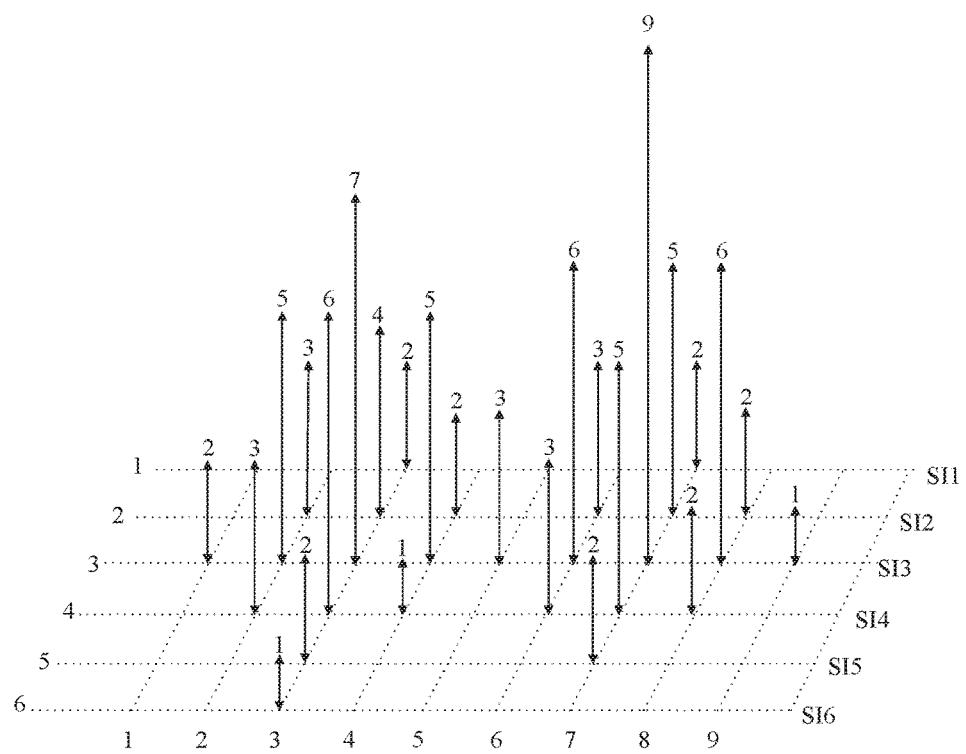
FIG. 9 is a schematic diagram illustrating assigning a division value based on ratios in a 2D sensing information.

For example, according to the third embodiment as described above, in a third 1D sensing information SI3, the 5th value is the division value, and the threshold is set to the division value 3, as shown in FIG. 9. In the first sub profile, a plurality of first differences are respectively the 2nd value (5−3)=2, the 3rd value (7−3)=4, and the 4th value (5−3)=2. Thus, the first value is equal to 2+4+2=8. In the second sub profile, a plurality of second differences are respectively the 6nd value (6−3)=3, the 7rd value (9−3)=6, and the 8th value (6−3)=3. Thus, the second value is equal to 3+6+3=12. The first proportion is equal to 3×(8/(8+12))=1.2, and the second proportion is equal to 3×(12/(8+12))=1.8. Accordingly, an adjusted centroid location Pc1 based on the values of the complete first profile would be (1×2+2×5+3×7+4×5+5×1.2)/(2+5+7+5+1.2)=2.92, and an adjusted centroid location Pc2 based on the values of the complete second profile would be (5×1.8+6×6+7×9+8×6+9×1)/(1.8+6+9+6+1)=6.93.

Furthermore, because there is no division value in the first 1D sensing information SI1, the centroid location of the first profile is 3, and the centroid location of the second profile is 7.

Because there is no division value in the second 1D sensing information SI2, the centroid location of the first profile is equal to (2×3+3×4+4×2)/(3+4+2)=2.89, and the centroid location of the second profile is equal to (6×3+7×5+8×2)/(3+5+2)=6.9.

Because there is no division value in the fourth 1D sensing information SI4, the centroid location of the first profile is equal to (2×3+3×6+4×1)/(3+6+1)=2.8, and the centroid location of the second profile is equal to (6×3+7×5+8×2)/(3+5+2)=6.9.

Because there is no division value in the fifth 1D sensing information SI5, the centroid location of the first profile is 3, and the centroid location of the second profile is 7.

Because there is no division value in the sixth 1D sensing information SI6, the centroid location of the first profile is 3, but there is no centroid location of the second profile.

As mentioned above, a first 2D centroid location could be determined based on all first centroid locations of the first profiles of the first region. The X coordinate of the first 2D centroid location is equal to (3×2+2.89×(3+4+2)+2.92×(2+5+7+5+1.2)+2.8×(3+6+1)+3×2+3×1)/(2+(3+4+2)+(2+5+7+5+1.2)+(3+6+1)+2+1)=2.9. The Y coordinate of the first 2D centroid location is equal to (1×2+2×(3+4+2)+3×(2+5+7+5+1.2)+4×(3+6+1)+5×2+6×1)/(2+(3+4+2)+(2+5+7+5+1.2)+(3+6+1)+2+1)=3.09. Thus, the first 2D centroid location is (2.9, 3.09).

Similarly, a second 2D centroid location could be determined based on all second centroid locations of the second profiles of the second region. The X coordinate of the second 2D centroid location is equal to (7×2+6.9×(3+5+2)+6.93×(1.8+6+9+6+1)+6.9×(3+5+2)+7×2)/(2+(3+5+2)+(1.8+6+9+6+1)+(3+5+2)+2)=6.92. The Y coordinate of the second 2D centroid location is equal to (1×2+2×(3+5+2)+3×(1.8+6+9+6+1)+4×(3+5+2)+5×2)/(2+(3+5+2)+(1.8+6+9+6+1)+(3+5+2)+2)=3. Thus, the second 2D centroid location is (6.92, 3).

Figure 8B:
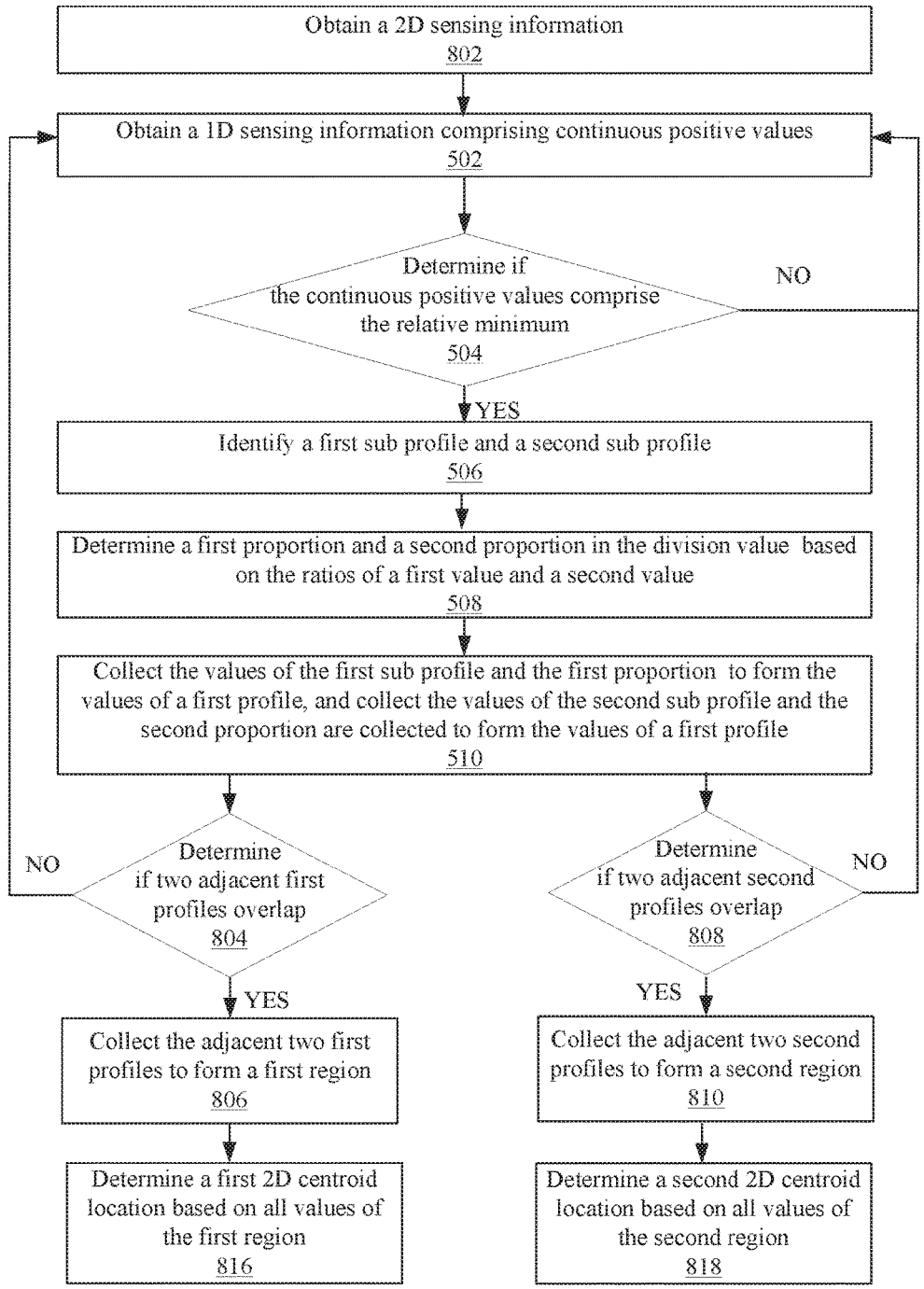
FIG. 8B is a schematic diagram illustrating the flowchart of a method for detecting touch or proximity in accordance with an embodiment of the present invention.

In addition, as shown in FIG. 8B, the step 804 of determining if the first profiles of the adjacent two 1D sensing information overlap based on the overlapping relationship between the adjacent two first profiles could be executed immediately after the step 510. If YES, the adjacent two first profiles are collected to form a first region, as shown in step 806. If NO, return to step 502. Then, as shown in step 816, the first 2D centroid location is determined based on all values of the first region.

Similarly, the step 808 of determining if the second profiles of the adjacent two 1D sensing information overlap based on the overlapping relationship between the adjacent two second profiles could be executed immediately after the step 510. If YES, the adjacent two second profiles are collected to form a second region, as shown in step 810. If NO, return to step 502. Then, as shown in step 818, the second 2D centroid location is determined based on all values of the second region.

For example, after determining that the first proportion is equal to 3×(8/(8+12))=1.2, a first 2D centroid location is determined based on all values of the first region and the 2D coordinates corresponding to the values of the first region, as shown in FIG. 9. The X coordinate of the first 2D centroid location is equal to (1×2+2×(3+5+3)+3×(2+4+7+6+2+1)+4×(2+5+1)+5×1.2)/(2+(3+5+3)+(2+4+7+6+2+1)+(2+5+1)+1.2)=2.9, and the Y coordinate of the first 2D centroid location is equal to (1×2+2×(3+4+2)+3×(2+5+7+5+1.2)+4×(3+6+1)+5×2+6×1)/(2+(3+4+2)+(2+5+7+5+1.2)+(3+6+1)+2+1)=3.09. Thus, the first 2D centroid location is (2.9, 3.09).

After determining that the second proportion is equal to 3×(12/(8+12))=1.8, a second 2D centroid location is determined based on all values of the second region and the 2D coordinates corresponding to the values of the second region. The X coordinate of the second 2D centroid location is equal to (5×1.8+6×(3+6+3)+7×(2+5+9+5+2)+8×(2+6+2)+9×1)/(1.8+(3+6+3)+(2+5+9+5+2)+(2+6+2)+1)=6.92, and the Y coordinate of the second 2D centroid location is equal to (1×2+2×(3+5+2)+3×(1.8+6+9+6+1)+4×(3+5+2)+5×2)/(2+(3+5+2)+(1.8+6+9+6+1)+(3+5+2)+2)=3. Thus, the second 2D centroid location is (6.92, 3).

Figure 10:
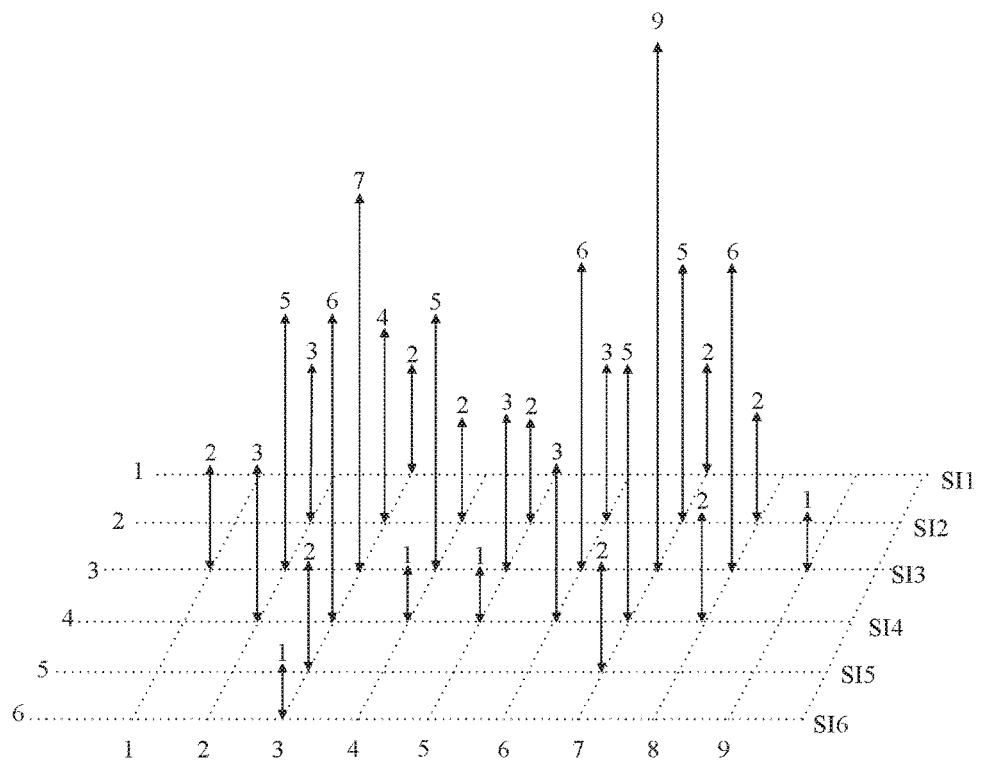
FIG. 10 is a schematic diagram illustrating assigning three division values based on ratios in a 2D sensing information.

According to a seventh embodiment, the 5th value of the second 2D sensing information SI2 is a first division value 2; the 5th value of the third 2D sensing information SI3 is a second division value 3; and the 5th value of the fourth 2D sensing information SI4 is a third division value 1, as shown in FIG. 10.

According to the embodiments as described above (for example of the fourth embodiment, the threshold is zero), the first proportion of the first division value is equal to 2×(3+4+2)/((3+4+2)+(3+5+2))=18/19=0.95, and the second proportion of the first division value is equal to 2×(3+5+2)/((3+4+2)+(3+5+2))=20/19=1.05.

The first proportion of the second division value is equal to 3×(2+5+7+5)/((2+5+7+5)+(6+9+6+1))=57/41=1.39, and the second proportion of the second division value is equal to 3×(6+9+6+1)/((2+5+7+5)+(6+9+6+1))=66/41=1.61.

The first proportion of the third division value is equal to 1×(3+6+1)/((3+6+1)+(3+5+2))=0.5, and the second proportion of the third division value is equal to 1×(3+5+2)/((3+6+1)+(3+5+2))=0.5.

Then, a first 2D centroid location is determined based on all values of the first region and the 2D coordinates corresponding to the values of the first region. The X coordinate of the first 2D centroid location is equal to (1×2+2×(3+5+3)+3×(2+4+7+6+2+1)+4×(2+5+1)+5×(0.95+1.39+0.5))/(2+(3+5+3)+(2+4+7+6+2+1)+(2+5+1)+(0.95+1.39+0.5))=2.97, and the Y coordinate of the first 2D centroid location is equal to (1×2+2×(3+4+2+0.95)+3×(2+5+7+5+1.39)+4×(3+6+1+0.5)+5×2+6×1)/(2+(3+4+2+0.95)+(2+5+7+5+1.39)+(3+6+1+0.5)+2+1)=3.08. Thus, the first 2D centroid location is (2.97, 3.08).

Similarly, a second 2D centroid location is determined based on all values of the second region and the 2D coordinates corresponding to the values of the second region. The X coordinate of the second 2D centroid location is equal to (5×(1.05+1.61+0.5)+6×(3+6+3)+7×(2+5+9+5+2)+8×(2+6+2)+9×1)/((1.05+1.61+0.5)+(3+6+3)+(2+5+9+5+2)+(2+6+2)+1)=6.87, and the Y coordinate of the second 2D centroid location is equal to (1(1×2+2×(1.05+3+5+2)+3×(1.61+6+9+6+1)+4×(0.5+3+5+2)+5×2)/(2+(1.05+3+5+2)+(1.61+6+9+6+1)+(0.5+3+5+2)+2)=2.99. Thus, the second 2D centroid location is (6.87, 2.99).

Figure 11:
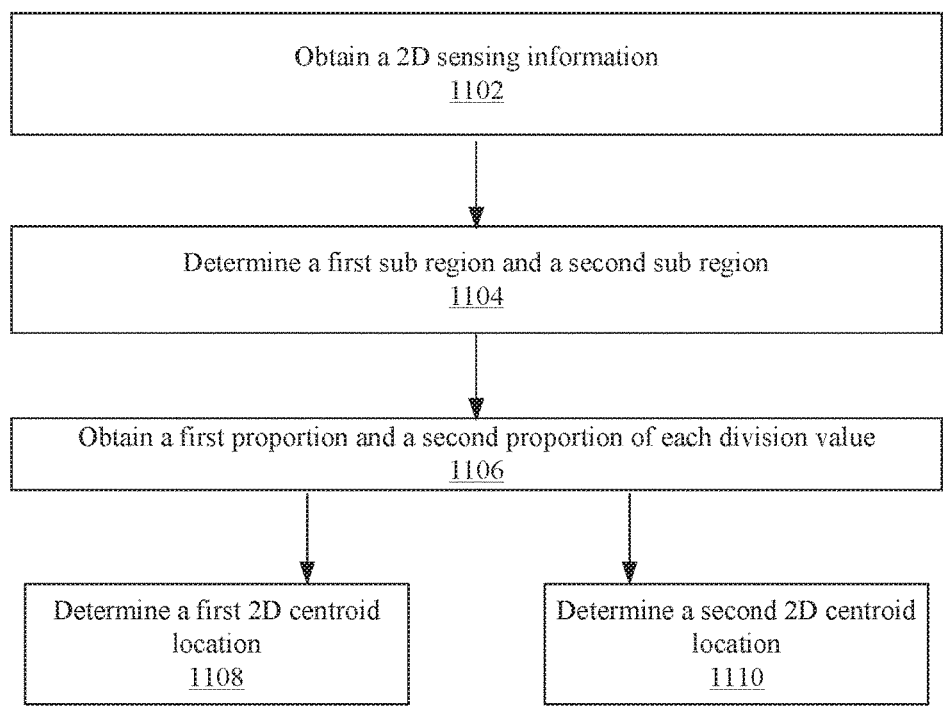
FIG. 11 is a schematic diagram illustrating the flowchart of a method for detecting touch or proximity in accordance with an embodiment of the present invention.

As mentioned above, the present invention further discloses a method for detecting touch or proximity, as shown in FIG. 11. As shown in step 1102, a 2D sensing information is obtained based on signals of a touch sensor. As shown in step 1104, a first sub region, all values of which are positive, and a second sub region, all values of which are positive of the 2D sensing information are determined. Each of one or more adjacent division values is adjacent to the first sub region and the second sub region. As shown in step 1106, a first proportion and a second proportion in each division value are determined.

Then, as shown in step 1108, a first 2D centroid location is determined based on all first proportions and all values greater than a threshold in the first sub region. As shown in step 1110, a second 2D centroid location is determined based on all second proportions and all values greater than the threshold in the second sub region.

The division values are positive, and each division value is between one value of the first sub region and one value of the second sub region. Each division value is smaller than or equal to the value of the first sub region closest to the division value and the value of the second sub region closest to the division value.

The 2D sensing information comprises a plurality of 1D sensing information arranged in parallel, each of which comprises at most one division value, and the 1D sensing information comprising a division value are adjacent to each other, wherein the first proportion corresponding to each division value is equal to (division value×first value)/(first value+second value), and the second proportion corresponding to the division value is equal to (division value×second value)/(first value+second value), wherein the first value comprises at least the value of the first sub region closest to the division value, and the second value comprises at least the value of the second sub region closest to the division value.

The first proportion and the second proportion of each division value could be determined by the embodiments as described above, and thus the ratios of the first value and the second value of all division values could be different. For example of the fourth embodiment, in the first sub region, the first value corresponding to a division value is a sum of the values of the 1D sensing information, comprising the corresponding division value, greater than a threshold. In the second sub region, the second value corresponding to the division value is a sum of the values of the 1D sensing information, comprising the corresponding division value, greater than the threshold.

According to an eighth embodiment, the first value is a sum of the values of the first sub region greater than a threshold, and the second value is a sum of the values of the second sub region greater than the threshold so as to determine a first proportion and a second proportion of each division value. Accordingly, the ratios of the first value and the second value of all division values are the same.

As illustrated in FIG. 10, the threshold is set to the maximum 3 of the division values. Thus, the values of the first region greater than the threshold 3 are respectively the 3rd value 4 of the second 1D sensing information SI2; the 2nd value 5, the 3rd value 7, and the 4th value 5 of the third 1D sensing information SI3; and the 3rd value 6 of the fourth 1D sensing information SI4. Accordingly, the first value is the sum of the values of the first region greater than the threshold (4+5+7+5+6=27).

The values of the second region greater than the threshold 3 are respectively the 7th value 5 of the second 1D sensing information SI2; the 6th value 6, the 7th value 9, and the 8th value 6 of the third 1D sensing information SI3; and the 7th value 5 of the fourth 1D sensing information SI4. Accordingly, the second value is the sum of the values of the second region greater than the threshold (5+6+9+6+5=31).

As mentioned above, in the first division value 2, the second division value 3, and the third division value 3, all the first proportions are determined based on the same ratio of 27 to (27+31), and all the second proportions are determined based on the same ratio of 31 to (27+31).

In addition, the preset invention further discloses a controller for detecting touch or proximity to execute the following steps according to the foregoing method. The controller obtains a 2D sensing information based on signals of a touch sensor. A first proportion and a second proportion in each division value are determined if the 2D sensing information comprises a first sub region, all values of which are positive, and a second sub region, all values of which are positive, and each of one or more adjacent division values is adjacent to the first sub region and the second sub region, wherein the division values are positive. In other words, each value of the first sub region, the second sub region, and the division values is positive. Then, a first 2D centroid location is determined based on all first proportions and all values of the first sub region, and a second 2D centroid location is determined based on all second proportions and all values of the second sub region.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A controller for detecting touch or proximity, executing the following steps:
    obtaining a 1D sensing information comprising continuous positive values based on signals of a touch sensor;
    designating a relative minimum as a division value to identify a first sub profile and a second sub profile if the continuous positive values comprise the relative minimum between a first relative maximum and a second relative maximum, wherein the first sub profile includes the first relative maximum but excludes the division value, and the second sub profile includes the second relative maximum but excludes the division value, wherein each value adjacent to the relative minimum is greater than the relative minimum, each value adjacent to the first relative maximum is smaller than the first relative maximum, and each value adjacent to the second relative maximum is smaller than the second relative maximum; and
    determining a first proportion and a second proportion in the division value based on ratios of a first value and a second value, wherein the first value comprises at least the value of the first sub profile closest to the division value and greater than a threshold, and the second value comprises at least the value of the second sub profile closest to the division value and greater than a threshold, wherein the first value is a sum from the first relative maximum to the value of the first sub profile closest to the division value, and the second value is a sum from the second relative maximum to the value of the second sub profile closest to the division value, wherein the threshold is greater than or equal to zero, but smaller than or equal to the division value.

2. The controller for detecting touch or proximity of claim 1, further executing the following steps:
collecting a plurality of values of the first sub profile and the first proportion to form the values of a first profile, wherein the first proportion is equal to (division value× first value)/(first value+second value); and
collecting a plurality of values of the second sub profile and the second proportion to form the values of a second profile, wherein the second proportion is equal to (division value×second value)/(first value+second value).

3. The controller for detecting touch or proximity of claim 1, further executing the following step:
determining a first centroid location based on the values of the first profile; and
determining a second centroid location based on the values of the second profile.

4. The controller for detecting touch or proximity of claim 1, wherein the first value is the difference between a threshold and the value of the first sub profile closest to the division value, and the second value is the difference between the threshold and the value of the second sub profile closest to the division value, wherein the threshold is greater than or equal to zero, but smaller than or equal to the division value.

5. The controller for detecting touch or proximity of claim 1, wherein a first difference is generated by subtracting the threshold from each value of the first sub profile greater than the threshold, and a second difference is generated by subtracting the threshold from each value of the second sub profile greater than the threshold, wherein the first value is a sum of the first differences, and the second value is a sum of the second differences, wherein the threshold is greater than or equal to zero, but smaller than or equal to the division value.

6. The controller for detecting touch or proximity of claim 1, wherein the first value is a sum of the values of the first sub profile greater than the threshold, and the second value is a sum of the values of the second sub profile greater than the threshold, wherein the threshold is greater than or equal to zero, but smaller than or equal to the division value.

7. A method for detecting touch or proximity, executed by a processor from a non-transitory computer-readable storage medium, comprising the following steps:
obtaining a 1D sensing information comprising continuous positive values based on signals of a touch sensor;
designating a relative minimum as a division value to identify a first sub profile and a second sub profile if the continuous positive values comprise the relative minimum between a first relative maximum and a second relative maximum, wherein the first sub profile includes the first relative maximum but excludes the division value, and the sub profile maximum includes the second relative maximum but excludes the division value, wherein each value adjacent to the relative minimum is greater than the relative minimum, each value adjacent to the first relative maximum is smaller than the first relative maximum, and each value adjacent to the second relative maximum is smaller than the second relative maximum; and determining a first proportion and a second proportion in the division value based on ratios of a first value and a second value, wherein the first value comprises at least the value of the first sub profile closest to the division value, and the second value comprises at least the value of the second sub profile closest to the division value, wherein the first value is a sum from the first relative maximum to the value of the first sub profile closest to the division value, and the second value is a sum from the second relative maximum to the value of the second sub profile closest to the division value, wherein the threshold is greater than or equal to zero, but smaller than or equal to the division value.

8. A controller for detecting touch or proximity, executing the following steps:
obtaining a 2D sensing information based on signals of a touch sensor, wherein the 2D sensing information comprising a plurality of 1D sensing information arranged in parallel;
designating a relative minimum as a division value to identify a first sub profile and a second sub profile if at least one 1D sensing information comprises continuous positive values comprising the relative minimum between a first relative maximum and a second relative maximum, wherein the first sub profile includes the first relative maximum but excludes the division value, and the second sub profile includes the second relative maximum but excludes the division value, wherein each value adjacent to the relative minimum is greater than the relative minimum, each value adjacent to the first relative maximum is smaller than the first relative maximum, and each value adjacent to the second relative maximum is smaller than the second relative maximum; and
determining a first proportion and a second proportion in the division value based on the ratios of a first value and a second value, wherein the first value comprises at least the value of the first sub profile closest to the division value, and the second value comprises at least the value of the second sub profile closest to the division value, wherein the first value is a sum from the first relative maximum to the value of the first sub profile closest to the division value, and the second value is a sum from the second relative maximum to the value of the second sub profile closest to the division value, wherein the threshold is greater than or equal to zero, but smaller than or equal to the division value;
collecting the values of the first sub profile and the first proportion to form the values of a first profile, and collecting the values of the second sub profile and the second proportion to form the values of a second profile; and
collecting the first profiles of the adjacent two 1D sensing information to form a first region if the two first profiles overlaps, and collecting the second profiles of the adjacent two 1D sensing information to form a second region if the two second profiles overlaps.

9. The controller for detecting touch or proximity of claim 8, further executing the following step:
determining a first 2D centroid location based on the values of the first region; and
determining a second 2D centroid location based on the values of the second region.

10. The controller for detecting touch or proximity of claim 8, further executing the following step:

determining a first centroid location based on the values of the first profile, and determining a first 2D centroid location based on all first centroid locations of the first region; and determining a second centroid location based on the values of the second profile, and determining a second 2D centroid location based on all second centroid locations of the second region.

11. The controller for detecting touch or proximity of claim 8, further executing the following steps:

determining that the first profiles of the adjacent two 1D sensing information overlap if the overlapping relationship between the adjacent two first profiles reaches at least one of the following conditions: the ratio of overlapping between the adjacent two first profiles exceeds a ratio threshold; the number of values overlapped by the adjacent two first profiles exceeds a number threshold; and the distance between the centroid locations of the adjacent two first profiles is within a distance threshold; and determining that the second profiles of the adjacent two 1D sensing information overlap if the overlapping relationship between the adjacent two second profiles reaches at least one of the following conditions: the ratio of overlapping between the adjacent two second profiles exceeds the ratio threshold;

the number of values overlapped by the adjacent two second profiles exceeds the number threshold; and the distance between the centroid locations of the adjacent two second profiles is within the distance threshold.

12. A method for detecting touch or proximity, executed by a processor from a non-transitory computer-readable storage medium, comprising the following steps:

obtaining a 2D sensing information based on signals of a touch sensor, wherein the 2D sensing information comprising a plurality of 1D sensing information arranged in parallel;

designating a relative minimum as a division value to identify a first sub profile and a second sub profile if at least one 1D sensing information comprises continuous positive values comprising the relative minimum between a first relative maximum and a second relative maximum, wherein the first sub profile includes the first relative maximum but excludes the division value, and the second sub profile includes the second relative maximum but excludes the division value, wherein each value adjacent to the relative minimum is greater than the relative minimum, each value adjacent to the first relative maximum is smaller than the first relative maximum, and each value adjacent to the second relative maximum is smaller than the second relative maximum; and determining a first proportion and a second proportion in the division value based on the ratios of a first value and a second value, wherein the first value comprises at least the value of the first sub profile closest to the division value, and the second value comprises at least the value of the second sub profile closest to the division value, wherein the first value is a sum from the first relative maximum to the value of the first sub profile closest to the division value, and the second value is a sum from the second relative maximum to the value of the second sub profile closest to the division value, wherein the threshold is greater than or equal to zero, but smaller than or equal to the division value;

collecting the values of the first sub profile and the first proportion to form the values of a first profile, and collecting the values of the second sub profile and the second proportion to form the values of a second profile; and collecting the first profiles of the adjacent two 1D sensing information to form a first region if the two first profiles overlaps, and collecting the second profiles of the adjacent two 1D sensing information to form a second region if the two second profiles overlaps.

13. A controller for detecting touch or proximity, executing the following steps:

obtaining a 2D sensing information based on signals of a touch sensor;

determining a first proportion and a second proportion in each division value if the 2D sensing information comprises a first sub region, all values of which are positive, and a second sub region, all values of which are positive, and each of one or more adjacent division values is adjacent to the first sub region and the second sub region, wherein the division values are positive; and determining a first 2D centroid location based on all first proportions and all values of the first sub region, and determining a second 2D centroid location based on all second proportions and all values of the second sub region, wherein the first value is a sum of the values of the first sub region greater than a threshold, and the second value is a sum of the values of the second sub region greater than the threshold, wherein the threshold is greater than or equal to zero, but smaller than or equal to a maximum of the division values, wherein the first proportions are determined based on a same ratio or different ratios of a first value and a second value, and the second proportions are determined based on a same ratio or different ratios of a first value and a second value.

14. The controller for detecting touch or proximity of claim 13, wherein each division value is smaller than or equal to the value of the first sub region closest to the division value and the value of the second sub region closest to the division value.

15. The controller for detecting touch or proximity of claim 13, wherein the 2D sensing information comprises a plurality of 1D sensing information arranged in parallel, each of which comprises at most one division value, and the 1D sensing information comprising a division value are adjacent to each other, wherein the first proportion corresponding to each division value is equal to (division value×first value)/(first value+second value), and the second proportion corresponding to the division value is equal to (division value×second value)/(first value+second value), wherein the first value comprises at least the value of the first sub region closest to the division value, and the second value comprises at least the value of the second sub region closest to the division value.

16. The controller for detecting touch or proximity of claim 13, wherein in the first sub region, the first value corresponding to the division value is a sum of the values of the 1D sensing information, comprising the corresponding division value, greater than a threshold, and in the second sub region, the second value corresponding to the division value is a sum of the values of the 1D sensing information, comprising the corresponding division value, greater than the threshold, wherein the threshold is greater than or equal to zero, but smaller than or equal to a maximum of the division values.

17. A method for detecting touch or proximity, executed by a processor from a non-transitory computer-readable storage medium, comprising the following steps:

obtaining a 2D sensing information based on signals of a touch sensor;

determining a first proportion and a second proportion in each division value if the 2D sensing information comprises a first sub region, all values of which are positive, and a second sub region, all values of which are positive, and each of one or more adjacent division values is adjacent to the first sub region and the second sub region, wherein the division values are positive; and determining a first 2D centroid location based on all first proportions and all values of the first sub region, and determining a second 2D centroid location based on all second proportions and all values of the second sub region, wherein the first value is a sum of the values of the first sub region greater than a threshold, and the second value is a sum of the values of the second sub region greater than the threshold, wherein the threshold is greater than or equal to zero, but smaller than or equal to a maximum of the division values, wherein the first proportions are determined based on a same ratio or different ratios of a first value and a second value, and the second proportions are determined based on a same ratio or different ratios of a first value and a second value.

* * * * *